(12) United States Patent  (10) Patent No.: US 9,107,145 B2
Hsieh  (45) Date of Patent: Aug. 11, 2015

(54) METHOD AND WIRELESS COMMUNICATION DEVICE FOR CONVEYING NEIGHBOR ACCESS POINT INFORMATION

(71) Applicant: HTC Corporation, Taoyuan County (TW)

(72) Inventor: Jing-Rong Hsieh, Taoyuan County (TW)

(73) Assignee: HTC Corporation, Taoyuan District, Taoyuan ( * ) Notice: Subject to any disclaimer, the term of this patent is extended or adjusted under 35 U.S.C. 154(b) by 116 days.

(21) Appl. No.: 13/936,217

(22) Filed: Jul. 8, 2013

(65) Prior Publication Data

US 2014/0010157 A1    Jan. 9, 2014

Related U.S. Application Data

(60) Provisional application No. 61/668,460, filed on Jul. 6, 2012.

(51) Int. Cl.
*H04W 48/16* (2009.01)
*H04W 88/08* (2009.01)

(52) U.S. Cl.
CPC .................................. *H04W 48/16* (2013.01)

(58) Field of Classification Search
None
See application file for complete search history.

(56) References Cited

U.S. PATENT DOCUMENTS

2009/0005105 A1\* 1/2009 Hwang et al. .................. 455/522
2013/0034045 A1\* 2/2013 Kwon et al. .................... 370/315

FOREIGN PATENT DOCUMENTS

WO    WO 2011059188 A2 \*  5/2011

\* cited by examiner

*Primary Examiner* — Omar Ghowrwal
(74) *Attorney, Agent, or Firm* — Winston Hsu; Scott Margo

(57) ABSTRACT

A method for one of a plurality access points (APs) of a wireless communication system to convey neighbor information to a station is disclosed. The method includes transmitting a compact information of at least one neighbor AP; wherein the compact information is transmitted in a frame and the compact information is used for scanning.

13 Claims, 5 Drawing Sheets

METHOD AND WIRELESS COMMUNICATION DEVICE FOR CONVEYING NEIGHBOR ACCESS POINT INFORMATION

CROSS REFERENCE TO RELATED APPLICATIONS

This application claims the benefit of U.S. Provisional Application No. 61/668,460, filed on Jul. 6, 2012 and entitled "Methods of conveying information for non-operating channels in wireless communication systems", the content of which is incorporated herein.

BACKGROUND OF THE INVENTION

1. Field of the Invention

The application relates to a method for conveying compact information of neighbor basic service sets (BSSs) or access points (APs) to a station (STA) in a scanning process to help reduce the scanning time.

2. Description of the Prior Art

A wireless communication system conforming to IEEE 802.11 standard may include at least a station (STA) and one or more access points (APs) operating in the same or different channels. Before using any network, a user must first find it. With wired networks, finding the network is to look for the cable or a jack on the wall. In wireless networks, stations must identify a compatible network before joining it. The process of identifying existing networks in an area is called scanning, which supports the process of determining the characteristics of the available basic service sets (BSSs).

A STA may operate in either a Passive Scanning mode or an Active Scanning mode according to a current value of a ScanMode parameter of a "MLME-SCAN.request" primitive. This primitive requests a survey of potential BSSs such that the STA can arbitrarily join. In detail, the primitive parameters can be realized as BSSType, Basic Service Set Identifier (BSSID), SSID, ScanType, ProbeDelay, ChannelList, MinChannelTime, MaxChannelTime, RequestInformation, SSID List, ChannelUsage, AccessNetworkType, HESSID, MeshID, and VendorSpecificInfo. The ChannelList parameter specifies a list of channels to be examined when scanning for one BSS. If the ScanType parameter indicates a passive scan, the STA may listen to each channel scanned for no longer than a maximum duration defined by the MaxChannelTime parameter. Active scanning involves the generation of Probe request frames and the subsequent processing of received Probe Response frames. Active scanning is prohibited in some frequency bands and regulatory domains.

Once the MLME-SCAN.request primitive is received, the STA may perform the scanning. The SSID parameter indicates the SSID for which to scan. The SSID List parameter indicates one or more SSIDs for which to scan. To become a member of a particular Extended Service Set (ESS) using passive scanning, the STA may scan for Beacon frames containing the ESS's SSID, returning all Beacon frames matching the desired SSID in the BSSDescriptionSet parameter of the corresponding MLME-SCAN.confirm primitive with the appropriate bits in the Capabilities Information field indicating whether the Beacon frame comes from an infrastructure BSS or Independent BSS (IBSS). If the value of dot11RMMeasurementPilotActivated is greater than 1, the STA may additionally scan for Measurement Pilot frames, returning in the BSSDescriptionFromMeasurementPilotSet parameter all Measurement Pilot frames that equal the requested BSSID of the corresponding MLME-SCAN.request primitive and are not members of the BSSDescriptionSet yet. To actively scan, the STA may transmit Probe request frames containing the desired SSID or one or more SSID List elements. When the SSID List element exists in the Probe Request frame, one or more of the SSID elements may include a wildcard SSID. When the STA scans for a BSS whose AP does not support the SSID List element, or for a BSS for which AP support of the SSID List element is unknown, the SSID element with an SSID or wildcard SSID may be included in the MLME-SCAN.request primitive. Once the scanning completes, an MLME-SCAN.confirm primitive may be issued by the MLME indicating all of the BSS information received.

Once receiving an MLME-SCAN.request primitive with the SSID parameter equal to the wildcard SSID, the STA may passively scan for any Beacon or Measurement Pilot frames, or actively transmit Probe request frames containing the wildcard SSID, as appropriate depending upon the value of ScanMode. Once the scanning completes, an MLME-SCAN.confirm primitive may be issued by the MLME indicating all of the BSS information received. If one STA's scanning does not result in finding a BSS with the desired SSID and of the desired type, or does not result in finding any BSS, the STA may start an IBSS when receiving the MLME-START.request primitive.

When receiving the MLME-SCAN.request primitive with ScanType indicating the active scan, the STA may process the following steps for each channel to be scanned:
  a) Wait until the ProbeDelay time has expired or a PHYRxStart.indication primitive has been received.
  b) Perform the Basic Access procedure.
  c) Send a probe request to the broadcast destination address, with the SSID and BSSID from the MLME-SCAN.request primitive. When the SSID List exists in the MLME-SCAN.request primitive, send one or more probe request frames, each with an SSID indicated in the SSID List and the BSSID from the MLME-SCAN.request primitive.
  d) Set to 0 and start a ProbeTimer.
  e) If PHY-CCA.indication (busy) primitive has not been detected before the ProbeTimer reaches MinChannelTime, then set NAV to 0 and scan the next channel, else when ProbeTimer reaches MaxChannelTime, process all received probe responses.
  f) Set NAV to 0 and scan the next channel.

When all channels in the ChannelList have been scanned, the MLME may issue an MLME-SCAN.confirm primitive with the BSSDescriptionSet containing all of the information gathered during the scanning. The BSSDescriptionSet is a set containing zero or more instances of a BSSDescription. Each BSSDescription includes the elements to be categorized as following:
  a) BSSID, SSID, and BSSType
  b) Beacon Interval, DTIM period
  c) Timing parameters
  d) PHY parameters
  e) BSSBasicRateSet
  f) EDCAParameterSet, QoSCapability
  g) HT Capabilities, HT Operation
  h) RM Enabled Capabilities
  i) Load, BSS Available Admission Capacity
  j) BSS Average Access Delay, BSS AC Access Delay
  k) RCPIMeasurement, RSNIMeasurement After compiling the scan results, the STA may join one of the BSSs, which represents a precursor to association and does not yet enable network access. Before this can happen, both authentication and association are required. It is an implementation-specific decision to choose which BSS for joining, which may involve user intervention. Common criteria used in the decision are power level and signal strength.

Since the IEEE 802.11 system supports multiple channels and the APs may select different or the same channel to provide BSSs/ESSs according to available channels and the capacity of each channel, STAs are usually necessary to scan for available APs on several channels before selecting one BSS to join. In a densely deployed area of wireless APs operating on the same or different channels, it may take a long time for the STA to check the existence of the BSSs, so as to find the suitable AP for association.

Therefore, the scanning process may be lengthy, and it is desirable for users to effectively reduce such delays and to reduce unnecessary scanning on channels which are less likely to have an AP or the existing AP is less likely to accept serving additional STAs. Also, it is also important to provide a method for the AP to collect neighbor information about the other non-operating APs, so as to avoid overhead thereof.

SUMMARY OF THE INVENTION

A method for conveying neighbor AP information to a STA from one of a plurality of APs is provided.

A method for one of a plurality access points (APs) of a wireless communication system to convey neighbor AP information to a station comprises transmitting a compact information of at least one neighbor AP; wherein the compact information is transmitted in a frame and the compact information is used for scanning.

A method for a station to receive neighbor access point (AP) information from one of a plurality APs of a wireless communication system comprises receiving a compact information of at least one neighbor AP; wherein the compact information is received in a frame and the compact information is used for scanning.

A communication device for a wireless communication system comprises a central processing unit; and a storage device coupled to the central processing unit for storing a programming code, wherein the programming code instructs the central processing unit to process a method for a station to receive neighbor access point (AP) information from one of a plurality APs of a wireless communication system. The method comprises receiving a compact information of at least one neighbor AP; wherein the compact information is received in a frame and the compact information is used for scanning.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
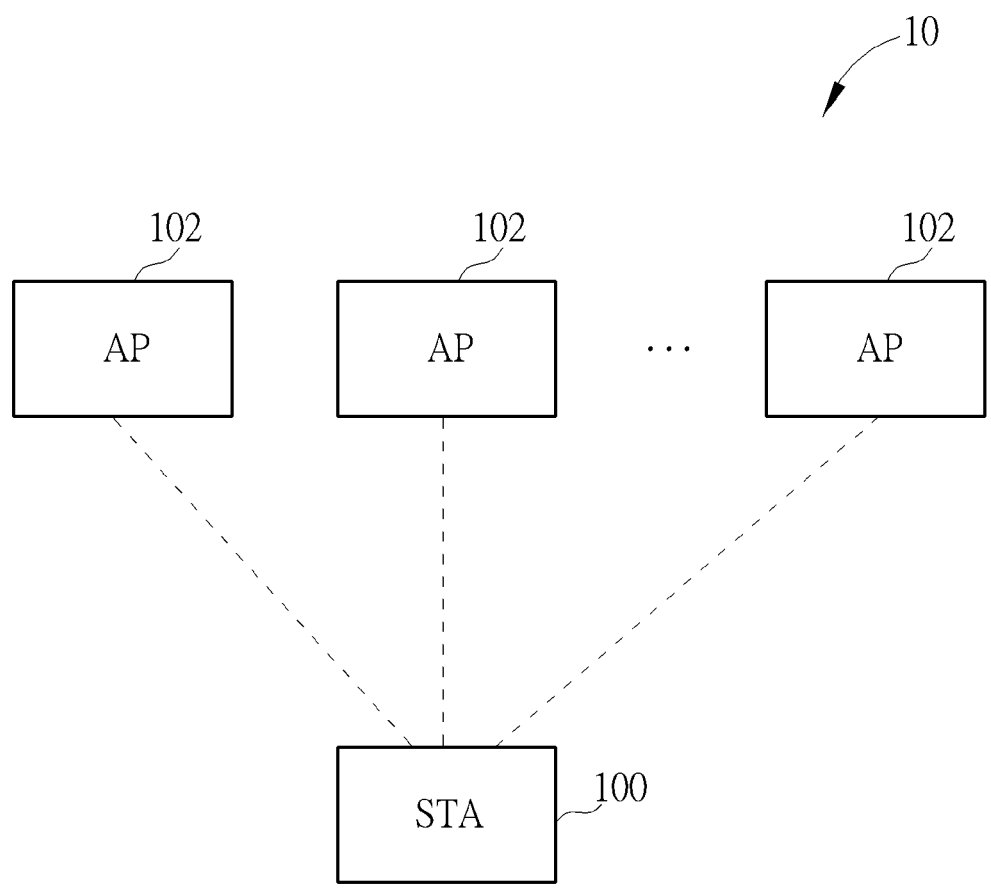
FIG. 1 is a schematic diagram of a wireless communication system according to an embodiment of the invention.

Please refer to FIG. 1, which is a schematic diagram of a wireless communication system 10 according to an embodiment of the invention. The wireless communication system 10 may be a wireless local area network system, such as a system conforming to IEEE 802.11 standard, and briefly includes a station (STA) 100 and a plurality of access points (APs) 102. The STA 100 may be a mobile device, a computer system, or any communication device. The number of the STA and the plurality of APs is demonstrated herein shown in FIG. 1, which is not limiting the scope of the invention.

Figure 2:
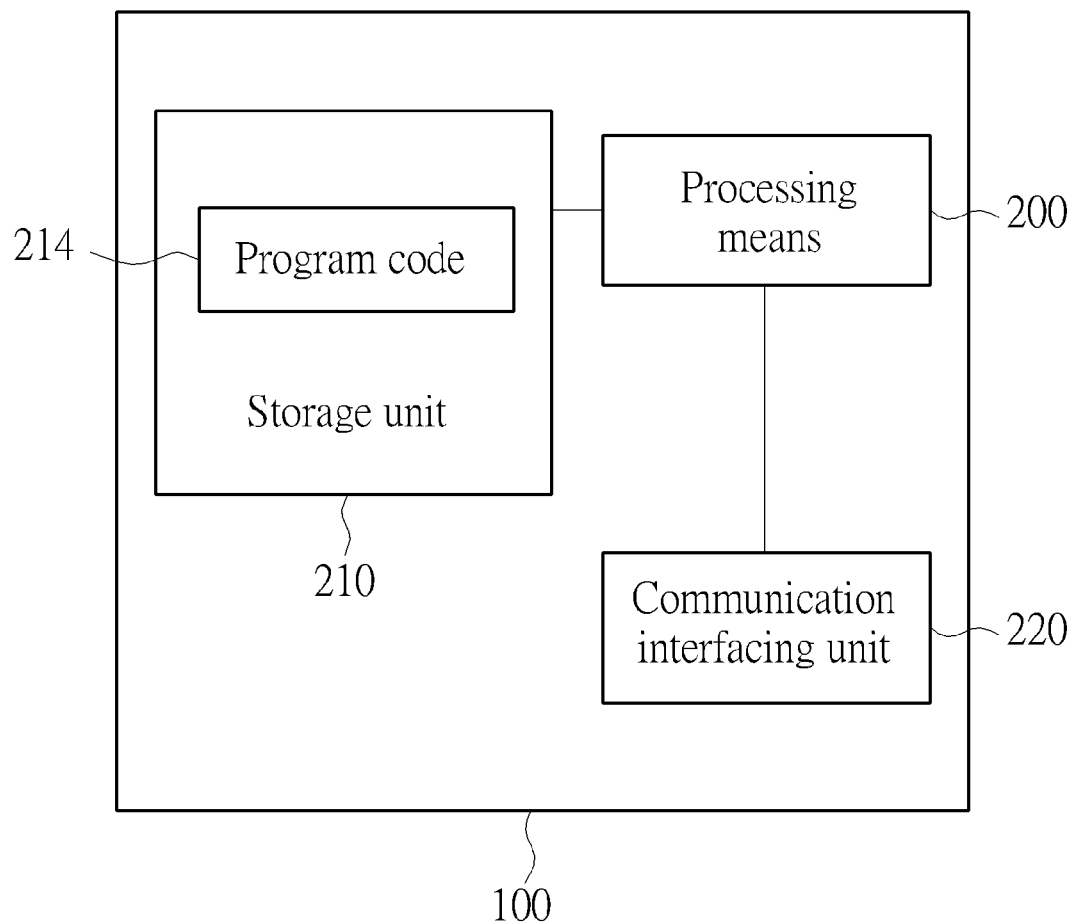
FIG. 2 is a schematic diagram of a STA according to an embodiment of the invention.

Please refer to FIG. 2, which is a schematic diagram of the STA 100 according to an embodiment of the invention. As shown in FIG. 2, the STA 100 includes a processing means 200, such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, and optical data storage devices. The communication interfacing unit 220 is preferably a radio transceiver for wirelessly communicating with a network according to processing results of the processing means 200.

Moreover, each of the APs 102 can also be realized to include a processing means, a memory unit and a communication interfacing unit, as similar to the STA 100. Thus, the STA 100 and the APs 102 may communicate with each other via the network. In comparison with the prior art receiving a plurality of BSSDescription from all the plurality of APs, the STA 100 of an embodiment of the invention may receive only some BSSDescriptions and compact information from at least one of the plurality of APs 102 and avoid doing exhaustive scanning for all the remaining APs 102 if information indicates that it is not worthy to do so. The compact information can be a difference information between the one of the plurality of APs 102 and neighbor APs 102 thereof.

Figure 3:
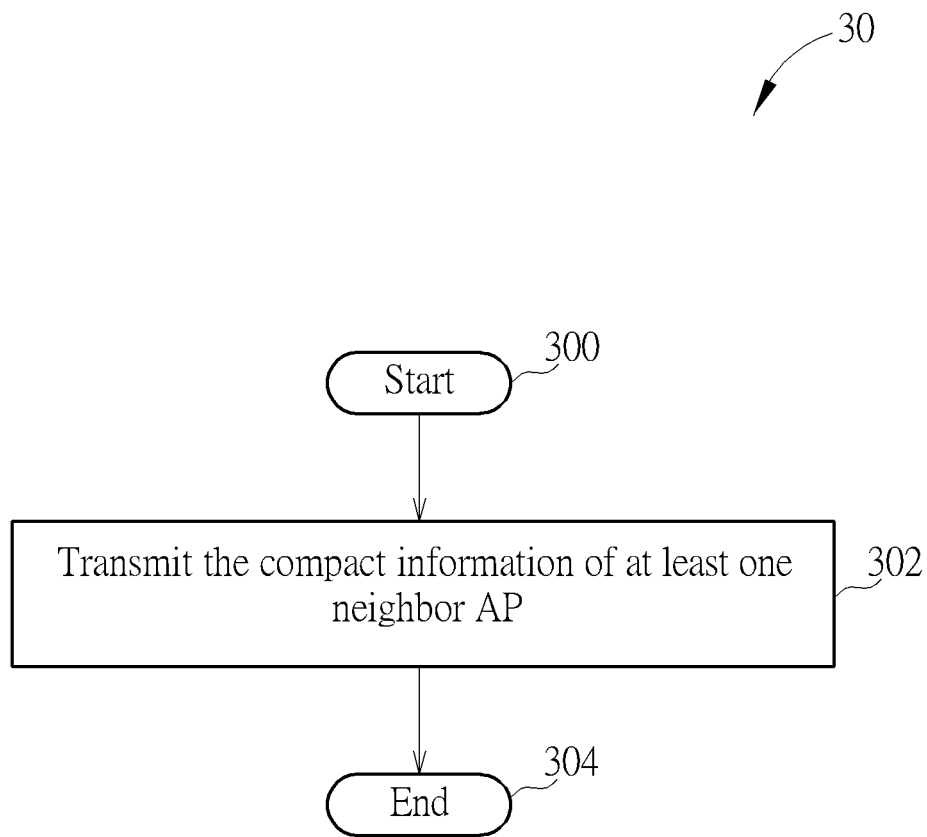
FIG. 3 to FIG. 5 are flowcharts of processes according to embodiments of the invention.

Further, a method for one of the plurality of APs 102 to convey the neighbor AP information to the STA 100 in an embodiment of the invention can be summarized as a process 30, as shown in FIG. 3. The process 30 can be compiled to be the program code 214 stored in the memory unit 210, and comprises, but not limited to, the following steps:

Step 300: Start.

Step 302: Transmit the compact information of at least one neighbor AP.

Step 304: End.

In the process 30, the compact information of the at least one neighbor AP can be transmitted to the STA 100, wherein the compact information is transmitted in a frame and the compact information is used for scanning of the STA 100.

In detail, the compact information specifies the difference information between the one of the plurality of APs 102 and the other neighbor APs corresponding to the one of the plurality of APs 102. A comparison value between the AP and the neighbor APs can be utilized to represent the compact information of the invention. Also, the frame in the embodiment of the invention can be obtained as a Beacon frame, a Probe Response frame, or a Measurement Pilot frame, which is not limiting the scope of the invention.

Also, the STA 100 can utilize the compact information to determine whether to initiate an association for the STA 100 while the scanning result is processed by the STA 100 with one of the plurality of APs. Thus, a fast initial linkage between the STA 100 and the one of the plurality of APs 102 (the operating AP) can be set up, or the STA 100 can determine to scan another neighbor AP from the plurality of APs 102. Accordingly, the embodiment of the invention may utilize the compact information related to the AP and the neighbor APs to reduce unnecessary scanning time for those channels which are less likely to have one AP, or to avoid scanning the existing AP which is less likely to serve additional STAs. Under such circumstances, although one of the plurality of APs 102 is scanned by the STA 100, the neighbor information of the other APs from the compact information can still be obtained by the user, which is convenient and efficient for the user to establish the association with a qualified AP.

Further, in the embodiment of the invention, the difference information may be obtained from comparison of basic service set (BBS) Load, BBS Average Access Delay or BSS Available Admission Capacity between the one of the plurality of APs 102 and the neighbor APs thereof. By utilizing the difference information (or the comparison) between the AP and the neighbor APs, the STA 100 can obtain/acquire an overall utilization corresponding to all the APs even though the STA 100 only associates/communicates with the AP. In detail, the BBS Load specifies information of station count, channel utilization or available admission capacity; the BBS Average Access Delay specifies information of access category (AC) access delay; and the BSS Available Admission Capacity specifies information of available admission capacity list for specific user priorities (UPs) and ACs.

Specifically, the UP is a value associated with a medium access control (MAC) service data unit (MSDU) indicating how the MSDU is to be handled, and the UP can be assigned to one MSDU in the layers above the MAC. Besides, the AC is a label for a common set of enhanced distributed channel access (EDCA) parameters utilized by a quality-of-service (QoS) STA to contend for the channel in order to transmit the MSDUs with certain priorities. In the embodiment, the STA 100 may also receive several BSSDescrptions with the compressed compact information representing information for BBSs on non-operating channels.

Hereinafter, there are some conventional demonstrations or realizations of the basic service set (BBS) Load, the BBS Average Access Delay and the BSS Available Admission Capacity, such that the STA 100 can easily utilize the mentioned parameters to choose the proper AP for connection/joining. First, a Channel Utilization field for the channel utilization is defined as the percentage of time, linearly scaled with 255 representing 100%, that the AP sensed the medium was busy, as indicated by either the physical or virtual carrier sense (CS) mechanism, and thus, a threshold can be set for the tolerating channel utilization and an obtained corresponding value higher than the threshold can be one of the indications of not suggesting joining the BSS. Next, the AC Access Delay can be realized as a scalar indication of the average access delay at one AP for services for each of the indicated Access Categories, and similarly, a threshold can be set for the tolerating delay for a specific AC and an obtained corresponding value higher than the threshold can be one of the indications of not suggesting joining the BSS. Additionally, the BSS Available Admission Capacity can be realized to include an unsigned integer that specifies the amount of medium time available using explicit admission control for the corresponding UP or AC traffic, in units of 32 µs per 1 second and provides a means for one AP to advertise admission capacity available for explicit admission control. Also, a threshold can be set for the desirable available admission capacity and an obtained corresponding value below the threshold can be one of the indications of not suggesting joining the BSS.

Accordingly, the embodiment of the invention about the compact information for the at least one neighbor AP can be obtained by a compression operation, and the compression operation can be realized as selecting different units or quantization levels for the compact information. The different units or quantization levels are obtained as signed integers or a coarser unit. In detail, a number of associated STA 100 of a BSS can be expressed in units of 8 (STAs) and the required field length is then ⅛ of the original size. The BSS AC Access Delay can use units like 32 µs to transform the indication to ¼ of the original size. The Available Admission Capacity can use units such as 64 µs to encode the amount of medium time available per 1 second.

Alternatively, transmission between the AP and the STA 100 can also be cooperated with another notification operation. In detail, the notification operation can be cooperated with the transmission of the compact information to utilize a single bit to be a notification of superior. For example, the number of the STA 100 of BBS on the other non-operating channels is no less than the current BBS.

Figure 4:
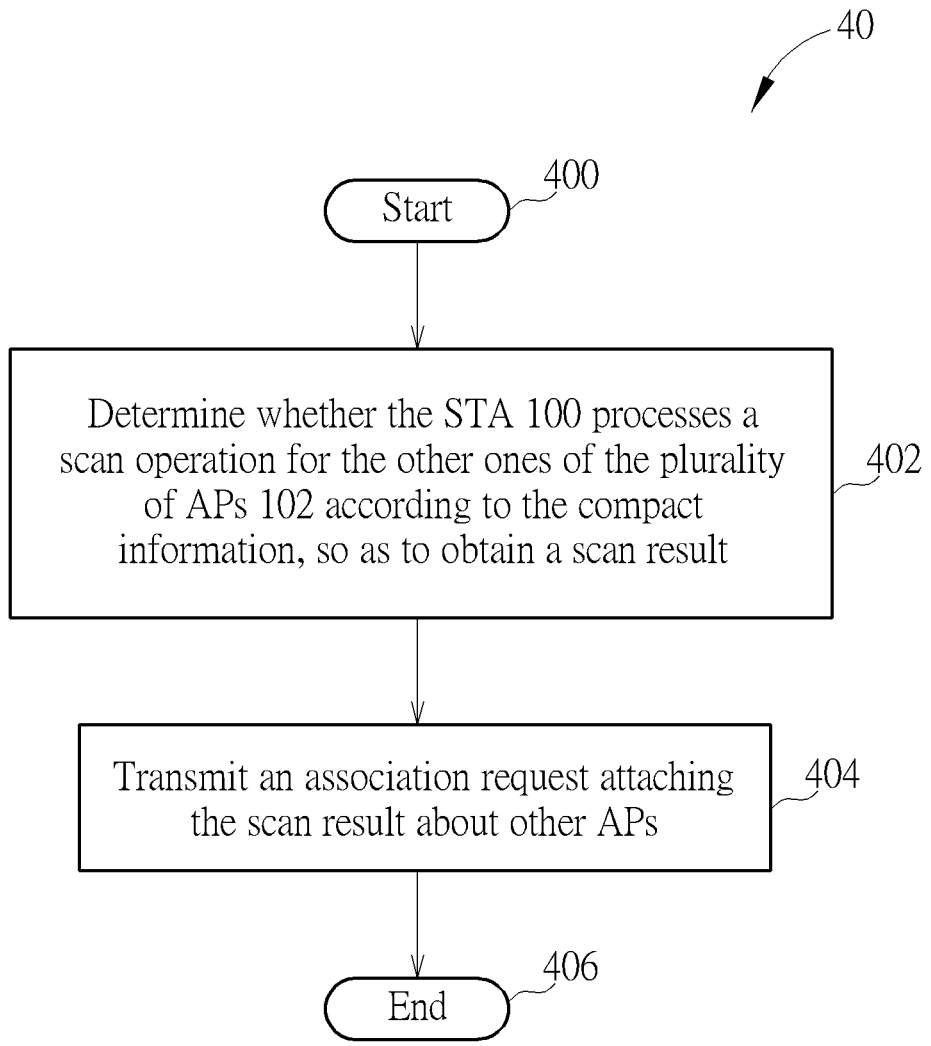

In another embodiment of the invention, another process 40 for the STA 100 can be compiled into another program code to be cooperated with the process 30, as shown in FIG. 4. The process 40 comprises, but not limited to, the following steps:

Step 400: Start.

Step 402: Determine whether the STA 100 processes a scan operation for the other ones of the plurality of APs 102 according to the compact information, so as to obtain a scan result.

Step 404: Transmit an association request attaching the scan result about other APs.

Step 406: End.

In step 402, the STA 100 utilizes the compact information to determine whether or not to process the scan operation for the other ones of the plurality of APs 102, and accordingly, the STA 100 can obtain the scan result. In step 404, the STA 100 transmits the association request attaching the scan result.

In detail, the STA 100 can obtain one or more BSS descriptions from at least one AP 102. Once the STA 100 has chosen the qualified AP for connection, the STA 100 can transmit the association request to the qualified AP. Along with the association request, the STA 100 can attach the BSS descriptions associated with the other ones of the plurality of APs 102, such as the channels that certain BSSs are currently operating and the loading information described above, to inform the qualified AP of the current overall utilization of the neighbor APs. Similarly, the attached scanning result associated with the other ones of the plurality of APs can also be compressed in the same form of the compact information, which is not limiting the scope of the invention.

Figure 5:
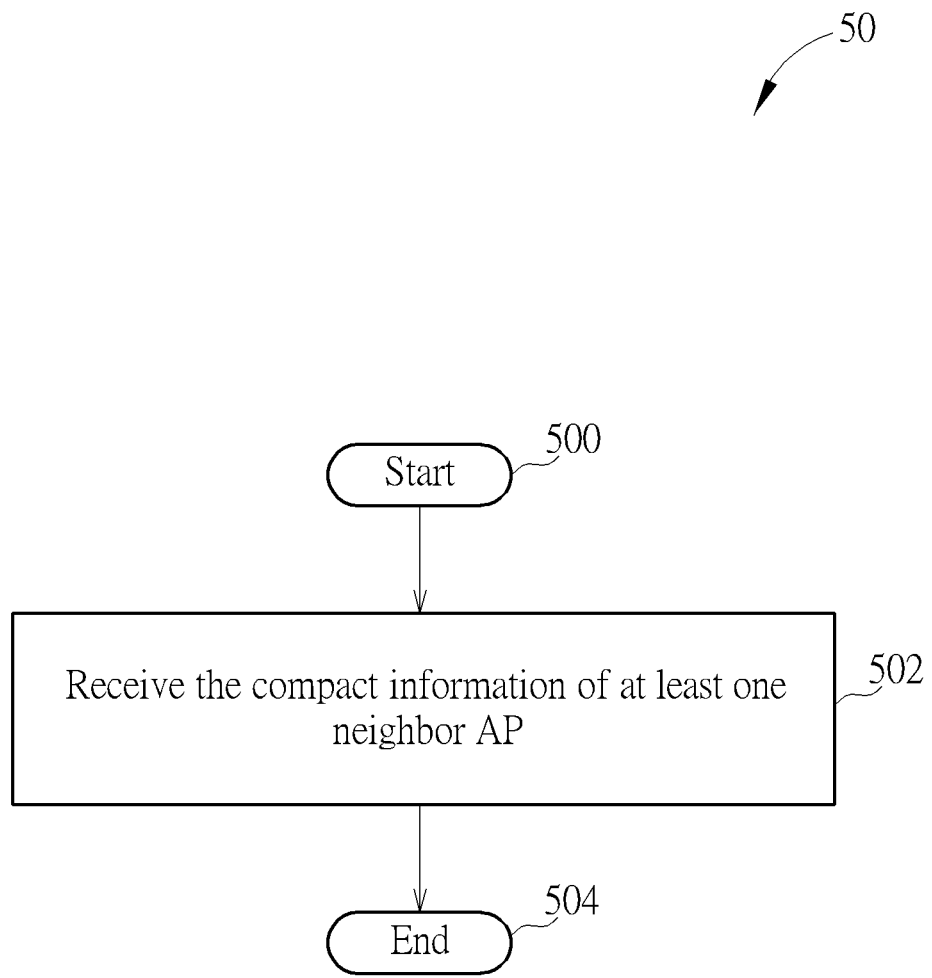

In another embodiment of the invention, another process 50 for the STA 100 to receive the neighbor information from the one of the plurality of APs 102 can be compiled into another program code to be cooperated with the process 30, as shown in FIG. 5. The process 50 comprises, but not limited to, the following steps:

Step 500: Start.

Step 502: Receive the compact information of at least one neighbor AP.

Step 504: End.

Noticeably, the program code of the process 50 is stored in STA 100 to be processed for instructing the STA 100, and the process 50 can be adaptively cooperated with operations of the processes 30 and 40. Under such circumstances, the STA 100 can adaptively receive the compact information in the frame from the operating AP, and the compact information comprises the information of the at least one neighbor AP for determining whether the STA 100 processes the scanning with the AP or the other neighbor APs. More details of the compact information can be understood via paragraphs of the processes 30 and 40, which is not described herein for brevity.

Also, those skilled in the art should adaptively make combinations, modifications and/or alterations on the abovementioned embodiment. The abovementioned steps of the processes 30, 40 and 50 comprising suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), the communication device and/or the STA 100 in the wireless communication system 10 of the invention.

In conclusion, the embodiment of the invention provides a method for conveying a compact information from one of a plurality of APs to a station, wherein the compact information specifies a difference information between the one of a plurality of APs and neighbor APs thereof and the STA can utilize the compact information to determine an association with one qualified AP or skip scanning some channels to shorten the scanning time. Also, the compact information in the embodiment of the invention can be realized as a compressed information to comprise the neighbor information of the neighbor APs of the one of the plurality APs. Under such circumstance, a scanning period of the STA can be shortened, and a qualified AP for the STA to join can be efficiently found, so as to broaden the application range of the wireless communication system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for one of a plurality of access points (APs) of a wireless communication system to convey neighbor AP information to a station, comprising:
   an AP of the plurality of APs transmitting a compact information of at least one neighbor AP to the station;
   wherein the compact information is used for scanning and specifying a difference information between the one of the plurality of APs and the at least one neighbor AP, the difference information being obtained from comparison of basic service set (BSS) AC Access Delay between the one of the plurality of APs and the at least one neighbor AP, the BSS AC Access Delay transforming an access delay indication to a smaller size than its original size.

2. The method of claim 1, wherein the compact information specifies a compressed information for the at least one neighbor AP.

3. The method of claim 2, wherein the compressed information is obtained from selecting different units or quantization levels.

4. A method for a station to receive neighbor access point (AP) information from one of a plurality APs of a wireless communication system, comprising:
   the station receiving a compact information of at least one neighbor AP;
   wherein the compact information is used for scanning and specifying a difference information between the one of the plurality of APs and the at least one neighbor AP, the difference information being obtained from comparison of basic service set (BSS) AC Access Delay between the one of the plurality of APs and the at least one neighbor AP, the BSS AC Access Delay transforming an access delay indication to a smaller size than its original size.

5. The method of claim 4, wherein the compact information specifies a compressed information for the at least one neighbor AP.

6. The method of claim 5, wherein the compressed information is obtained from selecting different units or quantization levels.

7. A communication device for a wireless communication system, comprising:
   a central processing unit; and
   a storage device coupled to the central processing unit for storing a programming code, wherein the programming code instructs the central processing unit to process a method for a station to receive neighbor access point (AP) information from one of a plurality APs of a wireless communication system, the method comprising:
   receiving a compact information of at least one neighbor AP;
   wherein the compact information is used for scanning and specifying a difference information between the one of the plurality of APs and the at least one neighbor AP, the difference information being obtained from comparison of basic service set (BSS) AC Access Delay between the one of the plurality of APs and the at least one neighbor AP, the BSS AC Access Delay transforming an access delay indication to a smaller size than its original size.

8. The communication device of claim 7, wherein the compact information specifies a compressed information for the at least one neighbor AP.

9. The communication device of claim 8, wherein the compressed information is obtained from selecting different units or quantization levels.

10. The method of claim 1, wherein the compact information is received in a frame.

11. The method of claim 10, wherein the frame is a Beacon frame, a Probe Response frame, or a Measurement Pilot frame.

12. The method of claim 4, wherein the compact information is received in a frame.

13. The communication device of claim 7, wherein the compact information is received in a frame.

* * * * *